United States Patent
Tai

(10) Patent No.: US 9,114,364 B2
(45) Date of Patent: Aug. 25, 2015

(54) HOLLOW FIBERS HAVING A WINDING CHANNEL

(71) Applicant: Industrial Technology Research Institute (ITRI), Hsin Chu (TW)

(72) Inventor: Chin-Chih Tai, Kaohsiung (TW)

(73) Assignee: Industrial Technology Research Institute, Hsin Chu (TW)

( * ) Notice: Subject to any disclaimer, the term of this patent is extended or adjusted under 35 U.S.C. 154(b) by 343 days.

(21) Appl. No.: 13/719,945

(22) Filed: Dec. 19, 2012

(65) Prior Publication Data

US 2014/0166571 A1 Jun. 19, 2014

(51) Int. Cl.
| | |
|---|---|
| *B01D 69/08* | (2006.01) |
| *B01D 69/02* | (2006.01) |
| *B01D 69/14* | (2006.01) |
| B01D 63/02 | (2006.01) |
| B01D 53/14 | (2006.01) |

(52) U.S. Cl.
CPC ............ *B01D 69/082* (2013.01); *B01D 69/085* (2013.01); *B01D 69/087* (2013.01); *B01D 69/088* (2013.01); *B01D 69/148* (2013.01); *B01D 2323/42* (2013.01); *B01D 2325/12* (2013.01)

(58) Field of Classification Search
CPC ........ B01D 63/02; B01D 63/04; B01D 63/06; B01D 63/10; B01D 63/12; B01D 69/04; B01D 69/08; B01D 53/22; B01D 63/021; B01D 63/022; B01D 63/025; B01D 63/027; B01D 63/068
USPC ........................................ 210/500.21, 500.23
See application file for complete search history.

(56) References Cited

U.S. PATENT DOCUMENTS

| | | | |
|---|---|---|---|
| 4,348,458 A * | 9/1982 | Otstot | 428/366 |
| 5,139,668 A | 8/1992 | Pan et al. | |
| 5,626,758 A * | 5/1997 | Belfort | 210/636 |
| 6,372,343 B1 | 4/2002 | Yamada et al. | |
| 6,824,679 B1 * | 11/2004 | Dzengeleski et al. | 210/497.1 |

(Continued)

FOREIGN PATENT DOCUMENTS

| | | |
|---|---|---|
| CN | 102389714 A | 3/2012 |
| TW | 500846 B | 9/2002 |

(Continued)

OTHER PUBLICATIONS

Li et al "Zeolite Monoliths for Air Separation Part 1: Manufacture and Characterisation" Trans IChemE vol. 76, pp. 921-930. 1998.
Lee et al "Manufacture and Characterisation of Silicalite Monliths" Adsorption Science & Technology vol. 18, pp. 147-170. 2000.

(Continued)

*Primary Examiner* — Katherine Zalasky
*Assistant Examiner* — Benjamin Lebron
(74) *Attorney, Agent, or Firm* — Cesari and McKenna, LLP

(57) ABSTRACT

A hollow fiber for adsorption or filtration. The hollow fiber contains a tubular matrix having a first end and a second end, and a winding channel formed through the tubular matrix and extending between the first end and the second end. The tubular matrix is porous and has a surface-area-to-volume ratio of 10 to 20000 $m^2/m^3$, a thickness of 0.05 to 9.95 mm, an outside diameter of 0.1 to 10 mm, and a length 10 to 90% that of the winding channel. Also disclosed is a method of preparing this hollow fiber.

17 Claims, 1 Drawing Sheet

(56) References Cited

U.S. PATENT DOCUMENTS

2003/0141238 A1* 7/2003 Herczeg .................. 210/321.87
2008/0272345 A1   11/2008 Werth et al.
2010/0035751 A1*  2/2010 Perera et al. .................. 502/402

FOREIGN PATENT DOCUMENTS

TW   2007/00352 A    1/2007
WO   WO-2007/007051 A1  1/2007

OTHER PUBLICATIONS

Tai et al "Development of Adsorbent Hollow Fibers for Environmental Applications" The Seventh World Chemical Engineering Congress, 2005.
Tai "Novel Adsorbent Hollow Fibers" PhD Thesis. 2007.
Lively et al "Hollow Fiber Adsorbents for $CO_2$ Removal from Flue Gas" Ind. Eng. Chem. Res. vol. 48, pp. 7314-7324. 2009.
Bhandari et al "Hollow Fiber Sorbents for Desulfurization of Natural Gas" Ind. Eng. Chem. Res. vol. 49, pp. 12038-12050. 2010.

* cited by examiner

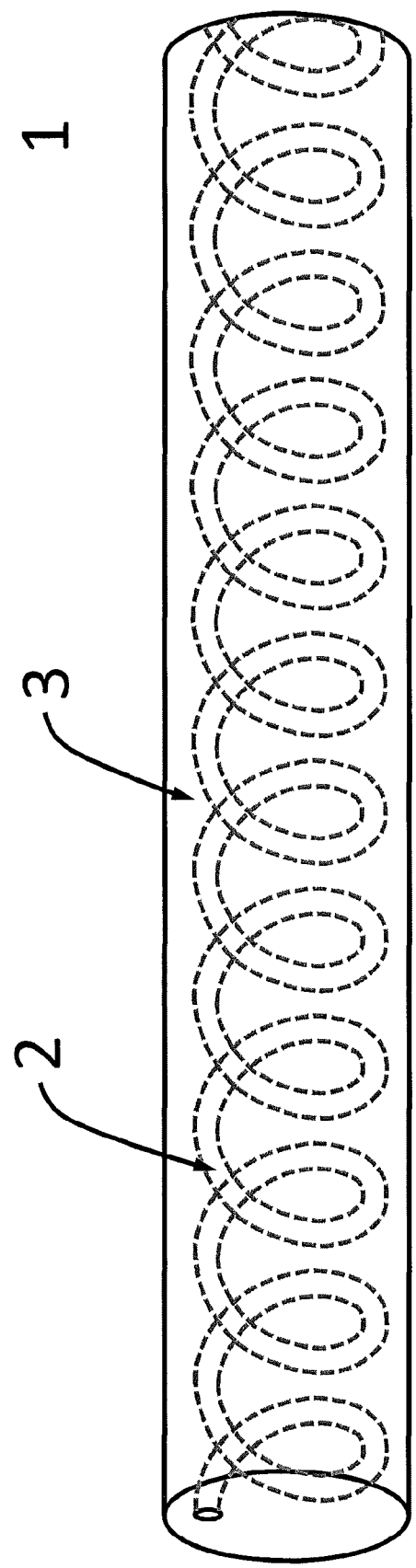

HOLLOW FIBERS HAVING A WINDING CHANNEL

BACKGROUND

Conventionally, adsorption of small molecules is achieved using molecular sieves or zeolites contained in a packed-bed system or a honeycomb-structured system.

A packed-bed system has a high adsorption capacity. It is regenerated after the system reaches its full adsorption capacity. The regeneration, a prolonged process (e.g., 24 hours), requires a significant amount of energy. A honeycomb-structured system is less effective in adsorption than a packed-bed system, as it has a high mass transfer resistance. Further, it is large in size and expensive to operate.

A recently developed hollow-fiber adsorption system has a higher adsorption capacity and a lower mass transfer resistance than both the packed-bed system and the honey comb-structured system. Its operational cost is low as it can be regenerated rapidly at a low temperature. See Perera and Tai, International Patent Application Publication WO 2008/110820 A1; Perera, International Patent Application Publication WO 2007/007051 A1; and Tai, Novel Adsorbent Hollow Fibers, Ph.D. thesis, University of Bath, UK (2007). Due to their low mass transfer resistance, existing hollow fibers do not hold a high-speed gas or liquid long enough for effective adsorption. See Lee et al., Adsorption Science and Technology, 18, 147-70 (2000).

Hollow fibers have also been used in filtration. However, they are not suitable for filtration of a high-speed gas or liquid.

There is a need to devise a hollow fiber efficient for adsorption or filtration.

SUMMARY

The hollow fiber of this invention exhibits unexpectedly high efficiency for filtering or adsorbing small molecules.

One aspect of this invention relates to a hollow fiber containing (i) a tubular matrix that has a first end and a second end, and (ii) a winding channel (e.g., a spiral channel) that is formed through the tubular matrix and extends between the first and second ends.

The tubular matrix, which is porous, can be single-layered or double-layered. It has a surface-area-to-volume ratio of 10 to 20000 $m^2/m^3$, a thickness of 0.05 to 9.95 mm, an outside diameter of 0.1 to 10 mm, and a length 10 to 90% that of the winding channel.

Note that the tubular matrix of the hollow fiber contains (i) a polymeric material that can serve as a binder, an adsorbent, or both, (ii) an inorganic adsorbent, (iii) an inorganic binder, or (iv) any combination thereof. A "binder" refers to a material which binds an adsorbent in a tubular matrix or otherwise forms the tubular matrix. After a hollow fiber is fabricated from a polymeric binder and an adsorbent, the polymeric binder can be removed, e.g., at high temperature (e.g., 500° C.), thus only leaving behind the adsorbent. An "adsorbent" refers to a material capable of adsorbing small molecules having a molecular weight 2000 Dalton or lower (e.g., 800 Dalton, 100 Dalton, and 18 Dalton). All hollow fibers of this invention are useful for filtration. Those containing an adsorbent (a polymeric adsorbent, an inorganic adsorbent, or both) can also be used for adsorption.

In one embodiment, the tubular matrix contains an inorganic adsorbent (0.1-95% by weight of the hollow fiber) and a polymeric binder. In another embodiment, the tubular matrix contains an inorganic adsorbent (also 0.1-95% by weight of the hollow fiber) and an inorganic binder. This invention further covers a hollow fiber that contains an electrically conductive material, preferably in the outer layer of its tubular matrix.

Examples of the polymeric material include, but are not limited to, polyether sulfone ("PESF"), polysulfone, polyvinylidene fluoride ("PVDF"), polyphenylsulfone ("PPSU"), polyacrylonitrile, cellulose acetate, cellulose diacetate, polyimide, polyetherimide, polyamide(aromatic), polyvinyl alcohol, poly(lactic acid), polyglycolic acid, poly(lactic-co-glycolic acid), polycaprolactone, polyvinyl pyrrolidone, ethylene vinyl alcohol, polydimethylsiloxane, and a combination thereof. Preferably, it is PESF, polysulfone, PVDF, polyphenylsulfone, and a combination thereof. PESF and PPSU are most preferred.

Examples of the inorganic adsorbent include, but are not limited to, type A zeolite, type X zeolite, type Y zeolite, high silica molecular sieves, mesoporous molecular sieves, porous metal-organic framework materials, activated carbon, carbon molecular sieve, and a combination thereof. Among preferred inorganic adsorbents are type A zeolite, type X zeolite, high silica molecular sieves, mesoporous molecular sieves, activated carbon, and a combination thereof. Type A zeolite, type X zeolite, high silica molecular sieves, and a combination thereof are most preferred. Examples of the inorganic binder include, but are not limited to, aluminum oxide, silicon dioxide, bentonite, China clay, hydroxylapatite, hyplas clay, calcium silicate, magnesium silicate, sodium silicate, sodium sulfate anhydrous, zirconium silicate, zircon opaque, silicon carbide, $(Ba,Pb)TiO_3$, lead bisilicate frit, lead sesquisilicate frit, low expansion frit, soft borax fit, standard borax frit, and a combination thereof. Preferably, it is aluminum oxide, silicon dioxide, bentonite, China clay, hyplas clay, calcium silicate, magnesium silicate, sodium silicate, sodium sulfate anhydrous, zirconium silicate, zircon opaque, lead bisilicate frit, lead sesquisilicate fit, low expansion fit, soft borax fit, standard borax fit, and a combination thereof.

Another aspect of this invention relates to a method of preparing a hollow fiber. The method includes the steps of: (1) providing a spinneret including a tube surrounded by a first orifice, the exit end of the tube having a bevel angle of 15-80°; (2) passing a bore fluid through the tube; (3) passing a first spinning dope through the first orifice, the first spinning dope containing an inorganic adsorbent; (4) bringing together the first spinning dope with the bore fluid when they exit the spinneret to form a hollow fiber precursor; (5) spinning the tube of the spinneret while the first spinning dope and the bore fluid exit the spinneret; and (6) coagulating the hollow fiber precursor in a coagulation liquid to form a spiral hollow fiber. The tube of the spinneret is spun at a speed of 1 to 200 rpm while the first spinning dope and the bore fluid exiting the spinneret, thereby forming a spiral channel having a pitch of 1 to 200 mm.

In one embodiment, the first orifice is surrounded by a second orifice, and, when passing the first spinning dope through the first orifice, a second spinning dope is passed through the second orifice, such that the first spinning dope contacts the second spinning dope when the two spinning dopes exit the spinneret. The second spinning dope can contain an electrically conductive material.

The details of one or more embodiments of the invention are set forth in the description below. Other features, objects, and advantages of the invention will be apparent from the description and the claims.

BRIEF DESCRIPTION OF THE DRAWING

FIG. 1 is a view of an exemplary embodiment of a hollow fiber containing a winding channel formed through and enclosed by a tubular matrix.

DETAILED DESCRIPTION

Disclosed herein is a hollow fiber for filtering or adsorbing small molecules, e.g., volatile organic compounds. It can be used for purification, concentration, and separation in a variety of fields, including the petroleum industry, the semiconductor industry, and the photoelectron industry.

Referring to FIG. 1, the hollow fiber (1) contains a winding channel (2) formed through and enclosed by a tubular matrix (3).

The winding channel, having a diameter of 0.05 to 9.95 mm (e.g., 0.1 to 5 mm, 0.5 to 2 mm, 0.2 to 0.6 mm, and 1 to 3 mm), can be zigzag or curved, e.g., spiral. A spiral channel typically has a pitch of 1 mm to 200 mm. The pitch refers to the width of one complete spiral turn, measured parallel to the axis of the hollow fiber.

The tubular matrix, which can be straight or curved, has a length 10 to 90% (e.g., 20 to 60%, 20 to 40%, 10-80%, and 20-70%) that of the channel, a thickness of 0.05 to 9.95 mm (e.g., 0.5 to 4 mm, 0.5 to 2 mm, 0.1-9 mm, 0.2-8 mm, 1-4 mm, and 1-5 mm), and an outside diameter of 0.1 to 10 mm (e.g., 1 to 5 mm, 1 to 3 mm, 3-8 mm, 2-4 mm, 0.2-2.5 mm, 0.3-6 mm, and 0.5-3 mm).

The matrix can have an effective surface porosity (i.e., surface porosity over pore length, $\epsilon/L_p$, $m^{-1}$) of 100 to 10000 (e.g., 200 to 8000 and 400 to 6000) and a pore size (i.e., pore diameter) of 1 nm to 50 μm (e.g., 0.1 to 10 μm, 1 to 100 nm, and 10 nm to 50 μm). The porosity and the pore size can be similar or vary greatly throughout a hollow fiber. The surface-area-to-volume ratio of the matrix is 10 to 20000 $m^2/m^3$ (e.g., 10 to 10000 $m^2/m^3$, 200 to 6000 $m^2/m^3$, 1000 to 4000 $m^2/m^3$, 100-5000 $m^2/m^3$, 250-3000 $m^2/m^3$, and 500-8000 $m^2/m^3$). The effective surface porosity, the pore size, and the surface-area-to-volume ratio are measured by methods well known in the art. See Carman, Flow of Gases Through Porous Media (Butterworths Scientific Publications 1956); Scott and Hughes, Industrial Membrane Separation Technology (Blackie Academic and Professional 1996); and Li et al., Tailor-Made Asymmetric PVDF Hollow Fibers for Soluble Gas Removal, AIChE Journal, 45, 1211-19 (1999).

The adsorption efficiency of a hollow fiber is attributable to its surface area. It can be determined by the packing density of a column packed with hollow fibers. The packing density is the ratio of the total surface area of the hollow fibers to the cross-sectional area of the column. A higher packing density and a greater surface-area-to-volume ratio generally result in a more efficient column.

Pore size distribution and porosity also determine the performance of a hollow fiber. The pore size distribution, a statistical distribution of the range of pore diameters found in a hollow fiber, can be 0.005 to 10 μm, 0.05 to 5 μm, or 0.5 to 2 μm. The porosity of a hollow fiber, defined as the percentage of free volume in the fiber, can be 10 to 200%, 20 to 140%, or 40 to 80%. A narrower pore size distribution and a higher porosity generally result in a higher flux rate through the hollow fiber.

In one embodiment, the matrix contains a polymeric material that typically serves as a binder. The polymeric material, typically 5 to 100% (e.g., 5 to 99.9%, 7 to 50% and 10 to 20%) by weight of the hollow fiber, can be PESF, polysulfone, polyvinylidene fluoride, polyphenylsulfone, polyacrylonitrile, cellulose acetate, cellulose diacetate, polyimide, polyetherimide, polyamide(aromatic), polyvinyl alcohol, poly(lactic acid), polyglycolic acid, poly(lactic-co-glycolic acid), polycaprolactone, polyvinyl pyrrolidone, ethylene vinyl alcohol, polydimethylsiloxane, or a combination thereof.

In another embodiment, tubular matrix contains an inorganic binder 5 to 100% (e.g., 5 to 99.9%, 7 to 50% and 10 to 20%) by weight of the hollow fiber. Examples include, but are not limited to, aluminum oxide, silicon dioxide, bentonite (e.g., potassium bentonite, sodium bentonite, calcium bentonite, and aluminum bentonite), China clay (e.g., $Al_2O_3.2SiO_2.2H_2O$), hydroxylapatite (e.g., $Ca_{10}(PO_4)_6(OH)_2$), hyplas clay (e.g., 20% $Al_2O_3.70\%$ $SiO_2.0.8\%$ $Fe_2O_3.2.3\%$ $K_2O.1.6\%$ $Na_2O$), calcium silicate (e.g., $Ca_3SiO_5$, $Ca_3Si_2O_7$, and $CaSiO_3$), magnesium silicate (e.g., $Mg_3Si_4O_{10}(OH)_2$), sodium silicate (e.g., $Na_2SiO_3$ and its hydrates, $SiO_2:Na_2O$ and its ratio between 2:1 and 3.75:1), sodium sulfate anhydrous, zirconium silicate (e.g., $ZrSiO_4$), zircon opaque (e.g., 53.89% $SiO_2.4.46\%$ $Al_2O_3.12.93\%$ $ZrO_2.9.42\%$ $CaO.2.03\%$ $MgO.12.96\%$ $ZnO.3.73\%$ $K_2O.0.58\%$ $Na_2O$), silicon carbide (SiC), (Ba,Pb)TiO3, lead bisilicate frit (e.g., 65% PbO.35% $SiO_2$), lead sesquisilicate fit (e.g., 71.23% PbO.28.77% $SiO_2$), low expansion fit (e.g., 0.1% $Li_2O.3.6\%$ $CaO.3.3\%$ $ZnO.2.4\%$ $MgO.8.2\%$ $Al_2O_3.63.6\%$ $SiO_2.17.8\%$ $B_2O_3$), soft borax frit (e.g., 10.3% $(Li_2O+Na_2O+K_2O).14\%$ $(CaO+MgO).3.3\%$ $ZnO.7.5\%$ $Al_2O_3.50\%$ $SiO_2.18\%$ $B_2O_3$), standard borax frit (e.g., 14.22% $CaO.0.16\%$ $MgO.1.56\%$ $K_2O.9.01\%$ $Na_2O.7.63\%$ $Al_2O_3$. 49.45% $SiO_2.17.93\%$ $B_2O_3$), or a combination thereof.

In still another embodiment, the matrix contains an inorganic adsorbent, preferably in fine powder form, having a particle size of 0.005 to 500 μm (e.g., 0.01 to 100 μm and 0.1 to 10 μm). The inorganic adsorbent, 0.1-95% (e.g., 75-90%, 80-90%, 50-95%, 65-80%, and 80-95%) by weight of the hollow fiber, can be type A zeolite (e.g., 3A, 4A, and 5A), type X zeolite (e.g., 10×), type Y zeolite (e.g., 13×), high silica molecular sieves (e.g., ZSM-5, SILICALITE™, HISIV™1000, HISIV™3000, HISIV™6000, ABSCENT™ 1000, ABSCENT™ 2000, ABSCENT™ 3000, USK Y-700, and USYZ 2000), mesoporous molecular sieves (e.g., MCM-41, 48 and 50), MOF materials (e.g., metal-organic frameworks), activated carbon, carbon molecular sieves, or a combination thereof. See Tai, Ph.D. thesis (2007); Perry et al., Materials Research Bulletin, 2, 409-18 (1967); Harlick et al., Microporous and Mesoporous Materials, 76, 71-79 (2004); Rouquerol et al., Adsorption by Powders and Porous Solids (Academic Press 1998); Ruthven, Principles of Adsorption and Adsorption Process (Wiley-Interscience 1984); Yang, Gas Separation by Adsorption Processes (Butterworth Publishers 1987); Beck et al., Chemistry of Materials, 6, 1816-21 (1994); and Haber et al., Overview of Transitional Ceramics, Engineered Materials Handbook, Volume 4 (The Materials Information Society, 2000).

The matrix can be multiple-layered, e.g., double-layered, three-layered, and four-layered. Each layer contains one or more materials the same as or different from those contained in another layer. When two layers contain the same materials, they are different in porosity or pore size. A skilled person in the art can decide, without undue experimentation, the material, the porosity, the pore size, and the thickness of each layer.

The matrix can further contain an electrically conductive material. When a hollow fiber adsorbs small molecules to the maximum adsorption capacity, it is regenerated by heat to remove the small molecules. The electrically conductive material generates heat thus desorbs the small molecules and regenerates the hollow fiber. A voltage is applied between the two ends of the hollow fiber to achieve the regeneration. The electrically conductive material can be mixed with an inorganic adsorbent or a polymeric adsorbent in one layer or form a separate layer with a binder. In a multiple-layered hollow fiber, this material can be present in each of the layers. It can also be present in only one layer, preferably the outer layer, having a thickness of 0.05 to 9.95 mm (e.g., 0.1 to 4 mm and 0.2 to 2 mm). The electrically conductive material typically has an electrical resistance of 10-100000 ohm/cm$^2$ (e.g., 10 to 40000 ohm/cm$^2$ and 500 to 10000 ohm/cm$^2$). Examples include, but are not limited to, activated carbon, carbon black, graphite, metal oxides (e.g., CuO and (Ba,Pb)TiO$_3$), metals, and a combination thereof.

Also within the scope of this invention is a method of preparing a hollow fiber. The method includes the steps of: (1) providing a spinneret including a tube surrounded by a first orifice, the exit end of the tube having a bevel angle of 0-90° (e.g., 15-80°, 20-60° and 40-50°); (2) passing a bore fluid through the tube; (3) passing a first spinning dope through the first orifice, the first spinning dope containing an inorganic adsorbent; (4) bringing together the first spinning dope with the bore fluid when they exit the spinneret to form a hollow fiber precursor; (5) spinning the tube of the spinneret while the first spinning dope and the bore fluid exit the spinneret; and (6) coagulating the hollow fiber precursor in a coagulation liquid to form a spiral hollow fiber. The tube of the spinneret is spun at a speed of 1 to 200 rpm (e.g., 5 to 100 rpm and 10 to 40 rpm) while the first spinning dope and the bore fluid exit the spinneret. A spiral channel thus formed has a pitch of 1 to 200 mm (e.g., 3 to 150 mm and 6 to 100 mm).

The tube of the spinneret has an inside diameter of 1 to 10 mm (e.g., 2 to 8 mm and 3 to 5 mm). It is surrounded by a first orifice, which has an inside diameter of 0.1 to 9.6 mm (e.g., 0.3 to 6 mm and 0.6 to 3 mm) and an outside diameter of 0.4 to 9.8 mm (e.g., 0.6 to 7 mm and 0.8 to 4 mm).

A first spinning dope is passed through the first orifice. It is obtained by dispersing an inorganic adsorbent, an inorganic binder, a polymeric material, or a combination thereof (e.g., inorganic adsorbent/inorganic binder/polymeric material by weight being 50/30/20 to 95/2.5/2.5, 75/15/15 to 90/5/5, or 80/10/10 to 88/6/6) in a blend solvent, and, optionally, stirred (e.g., at 50-100 rpm) for an extended period of time (e.g., 84 hours). A blend solvent is a solvent that can dissolve a polymeric material and is miscible with a bore fluid and a coagulation liquid described below. Examples of the blend solvent include, but are not limited to, N,N-dimethylacetamide ("DMAc"), 1-methyl-2-pyrrolidone ("NMP"), N,N-dimethylformamide ("DMF"), 1,4-dioxane, dichloromethane, acetone, and a combination thereof.

A bore fluid is passed through the tube of the spinneret. Examples of the bore fluid include, but are not limited to, water, methanol, ethanol, propanol, isopropanol, acetone, and a combination thereof. While the bore fluid is passed through the tube, the spinneret is spun so that a spiral channel is formed.

The bore fluid and the first spinning dope are brought together (i.e., contacting each other) when they exit the spinneret to form a hollow fiber precursor, which is then coagulated in a coagulation liquid (e.g., water) to form a spiral hollow fiber.

Following the same process described above, a double-layered hollow fiber can be prepared as follows. A spinneret having a second orifice is used. The second orifice, surrounding the first orifice, can have an inside diameter of 0.6 to 9.6 mm (e.g., 1 to 7.8 mm and 1.4 to 4.8 mm) and an outside diameter of 0.8 to 9.8 mm (e.g., 1.2 to 8 mm and 1.6 to 5 mm). In addition to a bore fluid and a first spinning dope, a second spinning dope is provided. Like the first spinning dope, the second spinning dope can also be prepared by dispersing an electrically conductive material, an inorganic adsorbent, an inorganic binder, a polymeric material, or a combination thereof in a blend solvent. Optionally, the second spinning dope contains an electrically conductive material and a polymeric material.

The bore fluid is passed through the tube of the spinneret, the first spinning dope is passed through the first orifice, and the second spinning dope is passed through the second orifice. The first spinning dope contacts the bore fluid and the second spinning dope when they exit the spinneret to form a hollow fiber precursor, which is coagulated to a double-layered hollow fiber.

Likewise, by passing three or more spinning dopes through a spinneret having three or more orifices (e.g., four orifices), one can also prepare a hollow fiber that have three or more layers.

The hollow fiber of this invention unexpectedly improves efficiency of traditional hollow fibers. First, the winding channel disturbs the flow of a gas or a liquid and diverts it to the wall of the hollow fiber for adsorption or filtration. Second, the winding increases the length of the path thus prolongs the time of passage, thereby maximizes adsorption. Further, the hollow fiber of this invention is stable at a high temperature, e.g., 250° C.

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications cited herein are incorporated by reference in their entirety.

Examples 1-7

Seven hollow fibers, i.e., A, B, C, D, E, A-25, and A-28, containing an inorganic adsorbent were prepared following the procedures described below.

First, a spinning dope was prepared, using a composition containing a solvent, a polymer, and an inorganic adsorbent listed in Table 1 below.

TABLE 1

Compositions of spinning dopes

| Hollow fiber | Solvent/Polymer, weight ratio | Inorganic adsorbent/Polymer, weight ratio |
|---|---|---|
| A | DMF/PESF, 4/1 | HiSiv 3000/PESF, 3/1 |
| B | NMP/PESF, 4/1 | HiSiv 3000/PESF, 3/1 |
| C | DMAc/PESF, 4/1 | HiSiv 3000/PESF, 3/1 |
| D | NMP/PSF, 4/1 | HiSiv 3000/PSF, 3/1 |
| E | NMP/PVDF, 4/1 | HiSiv 3000/PVDF, 3/1 |
| A-25 | NMP/PESF, 4/1 | Type A zeolite 3A/PESF, 5.7/1 |
| A-28 | NMP/PPSU, 4/1 | Type Y zeolite 13X/PPSU, 4/1 |

A polymer (100 g) was agitated, using a rotary pump at 100 rpm, in a solvent (400-500 mL) for 24 hours or until completely dissolved into a clear solution. The solution was filtered. An inorganic adsorbent (400-700 g) was added slowly under agitation at 500-3000 rpm, using an IKA Werke stirrer. The resulting mixture was agitated for 6-48 hours at the same speed. It was then degassed at 100 rpm for 24-48 hours to form a uniform spinning dope using a rotary pump.

A hollow fiber was fabricated using the spinning dope thus prepared. To fabricate a single-layered hollow fiber, a tube-in-orifice spinneret having a tube (diameter 0.72 mm and bevel angle 45°) and an orifice (outside diameter 2.0 mm) was used. The spinning dope was transferred to a stainless steel vessel, degassed by a vacuum pump for 10-30 minutes, pressurized to 0.5-8 bar with nitrogen gas, and allowed to pass through the orifice at 1-10 mL/min. Water, as a bore fluid, was passed through the tube at 1-30 mL/min. The tube of the spinneret was spun at a speed of 1-200 rpm. The spinning dope met the bore fluid at the end tip of the spinneret and formed a hollow fiber precursor, which was passed through an air gap (0-10 cm, e.g, 3 cm) between the end of the spinneret and a coagulation bath (i.e., water). The precursor was solidified to form a hollow fiber in water, as the coagulation bath, during a period of 48 hours. The hollow fiber thus prepared was washed thoroughly in a second bath, soaked for 24-96 hours in fresh water, and then dried at ambient conditions for 1-7 days.

Following the procedure described above, hollow fibers A-E, A-25, and A-28 were prepared. The compositions of the spinning dopes are shown in Table 1 above.

Two comparative hollow fibers were also prepared, each having a straight channel instead of a spiral channel.

More specifically, comparative hollow fibers A-25' and A-28' were prepared in the same manner as hollow fibers A-25 and A-28, except that a spinneret having a flat tube, instead of a spinneret having a bevelled tube, was used.

These seven hollow fibers, as well as the two comparative hollow fibers, were subjected to permeation tests and adsorption tests described below in Examples 16, 17, and 20.

Examples 8-10

Three double-layered hollow fibers, i.e., C-12, C-16, and C-19, were prepared following the same procedures described above, except that two spinning dopes and a double-orificed spinneret that had a tube (diameter 0.8 mm and bevel angle 45°), an inner orifice (outside diameter 2 mm and inside diameter 1.2 mm), and an outer orifice (outside diameter 4 mm and inside diameter 3 mm) were used.

A first spinning dope in a first vessel was pressurized to 2 bar and passed through the inner orifice. A second spinning dope in a second vessel was pressurized to 2.5-3 bar and passed through the outer orifice. The hollow fiber formed of the first and second spinning dopes was subjected to the same post-treatment described above.

Following these procedures, hollow fibers C-12, C-16, and C-19 were prepared:

In Example 8, hollow fiber C-12 was prepared from both a first spinning dope (13×/PESF by weight, 10/1) and a second spinning dope (13×/PESF by weight, 4/1). NMP was used as a solvent in an amount four times that of PESF by weight.

In Example 9, hollow fiber C-16 was prepared from both a first spinning dope (13×/PESF by weight, 10/1) and a second spinning dope (13×/PESF by weight, 3/1). The same amount of NMP was used as in Example 8.

In Example 10, hollow fiber C-19 was prepared from both a first spinning dope (13×/PESF by weight, 10/1) and a second spinning dope (13×/PESF by weight, 3/2). Again, NMP was used in the same amount as that used in Example 8.

The adsorption performance of the three double-layered hollow fibers was tested, shown in Example 19 below.

Examples 11-13

Three hollow fibers, i.e., S-01, S-02, and S-03, containing an inorganic material were prepared following the procedures described below.

First, a spinning dope was prepared from NMP, PESF, $Al_2O_3$, and fumed silica gel/magnesia. Three types of $Al_2O_3$ (i.e., having particle sizes of 1, 0.3, and 0.01-0.02, separately) were used. Their weight ratios are shown in Table 2 below.

TABLE 2

Compositions of spinning dopes

| Hollow fiber | NMP/PESF weight ratio | $Al_2O_3$/PESF, Weight ratio | $Al_2O_3$ 1/0.3/ 0.01-0.02 μm, Weight ratio | Additive (wt %) |
|---|---|---|---|---|
| S-01 | 6/1 | 5/1 | 92/5/2 | 1% fumed silica |
| S-02 | 5/1 | 4/1 | 95/3/1 | 0.5% fumed silica 0.5% magnesia |
| S-03 | 6/1 | 6/1 | 95/2/1 | 1% fumed silica 1% magnesia |

To prepare a spinning dope, NMP and PESF were mixed and stirred on a rotary pump for 24 to 48 hours to form a polymer solution, which was then agitated in an IKA Werke stirrer at 500-1000 rpm. $Al_2O_3$ was added. The resulting mixture was stirred for 2-4 days to allow uniform dispersion of $Al_2O_3$. $SiO_2$ (i.e., fumed silica) and/or MgO (i.e., magnesia) was added and stirred for 1-2 days to form a uniform dispersion, which was filtered through a 100 μm Nylon filter paper to remove large particles. The filtered dispersion was degassed for 1-2 days using a rotary pump to yield the spinning dope.

Second, a hollow fiber was fabricated using the spinning dope thus prepared. The spinning dope was transferred to a stainless steel vessel and degassed by a vacuum pump for 30 minutes at room temperature. The vessel was pressurized to 2 bar using nitrogen. Water was used as a bore fluid and also as a coagulation bath. A tube-in-orifice spinneret having a tube (diameter 0.72 mm and bevel angle 45°) and an orifice (diameter 2.0 mm) was used. The air gap between the spinneret and the coagulation bath was 3 cm. When the bore fluid was passed through the tube at 8 mL/min and the spinning dope was passed through the orifice, the tube was spun at a speed of 30 rpm. A hollow fiber precursor was passed through the air gap and was solidified to form a tubule in the coagulation bath during a period of 48 hours. The tubule thus prepared was washed thoroughly in a second bath, soaked for 48 hours in fresh water, dried at ambient conditions for 3-4 days.

Finally, the tubule was calcined to yield an inorganic hollow fiber. It was heated in a furnace according to a temperature program. Initially, the tubule was heated at 600° C. for 5 hours. The temperature was raised to 900° C. at a rate of 1.5° C./minute, then to 1100° C. at 2.5° C./minute, and to 1550° C. at 1° C./minute. The tubule was calcined at 1550° C. for 10-12 hours to yield the final hollow fiber.

Following the procedures described above, three hollow fibers S-01, S-02, and S03 were prepared. The compositions of the spinning dopes are shown in Table 2 above.

Examples 14 and 15

Two inorganic hollow fibers, i.e., HF-14a and HF-14b, were prepared following the procedures described below.

In Example 14, hollow fiber HF-14a was prepared using (i) a first spinning dope was prepared by mixing lead bisilicate frit and silicalite, 15/85 by weight, in NMP, and (ii) a second spinning dope was also prepared also by mixing lead bisilicate frit and silicalite, 40/60 by weight, in NMP. Following the procedures described in Examples 11-13 above, hollow fiber HF-14a was prepared, which was calcined at 660° C. for 18 hours.

In Example 15, hollow fiber HF-14b was prepared in the same manner as hollow fiber HF-14a except that it was calcines at 660° C. for 24 hours, instead of 18 hours.

Example 16

The hollow fibers prepared in Examples 1-5, 11, and 12 were characterized using the methods described below.

Gas Permeation Test

Dead-end gas permeation assays were carried out to determine the average pore size, the effective surface porosity, and the gas permeability of a hollow fiber, which was sealed with Araldite® (Epoxy) at one end. Nitrogen gas was applied on the outside of the hollow fiber at the other end. It was measured at different trans-membrane pressures by a Brooks mass flow indicator. See Li et al., Tailor-Made Asymmetric PVDF Hollow Fibers for Soluble Gas Removal, AIChE Journal, 45, 1211-19 (1999); and Tai, Ph.D. thesis, (2007).

Average pore size (r, i.e., average pore diameter) and effective surface porosity ($\epsilon/L_p$), two important parameters of a hollow fiber, were calculated using the following equations:

$$r = (16/3)(P_0/K_0)(8RT/\pi M)^{1/2}\mu \quad (1)$$

$$\epsilon/L_p = 8\mu RT P_0/r^2 \quad (2).$$

In these two equations, R is the gas constant, T is absolute temperature, M is molecular weight and μ is gas viscosity, and $K_0$ and $P_0$ are the intercept and slope respectively, determined by plotting pressure-normalized permeation flux against average pressure. See Carman, Flow of Gases through Porous Media (Butterworth Scientific Publications 1956); Shih et al., Morphology of Microporous Poly(Vinylidene Fluoride), Membranes Studied by Gas Permeation and Scanning Microscopy, Journal of Membrane Science, 50(3), 299-317 (1990) (describing two methods, i.e., the Poiseuille flow method and the Knudsen flow method); and Hatim et al., Pd/Al$_2$O$_3$ Composite Hollow Fiber Membranes: Effect of Substrate Resistances on H2 Permeation Properties, Chemical Engineering Science, 66, 1150-58 (2011). The gas permeability ($J_i$) was calculated using the equation below. See Carman (1956) and Shih (1990).

$$J_i = (2/3)(8RT/\pi M)^{1/2}(1/RT)(r\epsilon/L_p) + (P/8\mu RT)(r^2\epsilon/L_p) \quad (3).$$

The average pore size, effective surface porosities, and gas permeability values for hollow fibers A-E, S-01, and S-02 are shown in Tables 3 and 4 below.

TABLE 3

Properties of hollow fibers A-E prepared in Examples 1-5, using the Poiseuille method

| Hollow Fiber | Average pore diameter (nm) | Gas permeability (mol m$^{-2}$ Pa$^{-1}$ s$^{-1}$) (N$_2$, 1 atm) | Effective surface porosity (m$^{-1}$), $\epsilon/L_p$ |
|---|---|---|---|
| A | 166 | 2.97 × 10$^{-5}$ | 2340 |
| B | 304 | 3.29 × 10$^{-5}$ | 1250 |
| C | 179 | 1.08 × 10$^{-5}$ | 765 |
| D | 146 | 1.97 × 10$^{-5}$ | 1800 |
| E | 1341 | 5.22 × 10$^{-5}$ | 239 |

TABLE 4

Properties of hollow fibers S-01 and S-02 prepared in Examples 11 and 12

| Hollow fiber | OD/ID (mm) | Number of Fibers | Poiseuille flow method | | Knudsen flow method | | Gas permeability (molm$^{-2}$ Pa$^{-1}$ s$^{-1}$) |
| | | | Average pore diameter (mm) | Effective surface porosity $\epsilon/L_p$, (m$^{-1}$) | Average pore diameter (mm) | Effective surface porosity, ($\epsilon/q^2$) | |
|---|---|---|---|---|---|---|---|
| S-01 | 1.2/0.6 | 130 | 20 | 3420 | 11.7 | 1.49 | 4.56 × 10$^{-6}$ |
| S-02 | 1.18/0.9 | 90 | 46 | 5580 | 22.6 | 3 | 1.78 × 10$^{-5}$ |

Example 17

Three hollow fibers, i.e., hollow fibers A-C, prepared in Examples 1-3, were tested for their adsorption performance.

To obtain breakthrough curves, a dynamic adsorption assay was carried out using a method and an apparatus described in Lee et al., Manufacture and Characterisation of Silicalite Monoliths, Adsorption Science and Technology, 18(2), 147-170 (2000). The apparatus included a column, a flow system for supplying the feed stream, and an analytical system for monitoring the effluent gas concentration.

A column was assembled that contained 50 packed hollow fibers, each having a length of 25 cm. For comparative study, another column containing commercial pellets (1.0×1.18 mm, purchased from Universal Oil Products) was used for comparison studies. The commercial pellets in the column had a weight the same as that of the 50 hollow fibers. N-butane was selected as a model volatile organic compound. Before being passed through a column, it was mixed with N$_2$ (a carrier gas) at a concentration of 6000 ppm. The gas flow rate was set at 1.5 L/min.

The gas mixture was passed through an adsorption column. The n-butane concentration and the progress of the breakthrough curve for the adsorption column were continuously monitored using a flame ionisation detector (Signal Instruments, model 3000). All adsorption assays were carried out at 25° C. The gas flew through the column upwards for adsorption and downwards during the regeneration of the column.

An adsorption breakthrough curve was obtained by plotting the ratio between the n-butane concentration after adsorption and the initial n-butane concentration as a function of time from the start of the n-butane flow. A breakthrough time was obtained from the breakthrough curve.

Hollow fibers A, B, and C were subjected to the dynamic adsorption assays described above. Their adsorption breakthrough times were obtained. Hollow fiber A showed a breakthrough time of 29 minutes, hollow fiber B showed a breakthrough time of 33 minutes, and hollow fiber C showed a breakthrough time of 26 minutes. The comparative commercial pellet had a breakthrough time of 22 minutes. Unexpectedly, the three hollow fibers of this invention all demonstrated a much longer breakthrough time than the commercial pellet.

Example 18

Two hollow fibers prepared in Examples 14 and 15, i.e., HF-14a and HF-14b, were examined for their adsorption performance.

Adsorption assays were carried out using the same method described in Example 17 except that a column containing 40 packed hollow fibers, each having a length of 24 cm, was used.

Breakthrough curves were plotted. Compared to the commercial pellet column used in Example 17, the breakthrough curves of both hollow fibers HF-14a and HF-14b were unexpectedly much sharper, indicating a high mass-transfer rate and a large effective surface area. Hollow fiber HF-14a showed a breakthrough time of 76 minutes and an adsorption capacity of 8.7%. Hollow fiber HF-14b, on the other hand, showed a breakthrough time of 58 minutes and an adsorption capacity of 6.8%. Unexpectedly, both hollow fibers had an absorption capacity much greater than that of the commercial pellet, which was only 1.4% shown in Example 19 below.

Example 19

The adsorption performance of three hollow fibers prepared in Examples 8-10, i.e., hollow fibers C-12, C-16, and C-19, was measured.

Adsorption assays were carried out following the procedures described in Example 17 except that a different column and $CO_2$, instead of n-butane, were used. Three columns were assembled each containing packed hollow fibers (37-40 g and 24 cm). A comparative column containing 13× commercial pellets (4×3.2 mm) was also packed. The initial $CO_2$ concentration was 3000 ppm. The gas flow rate was 1 L/min. The $N_2$ pressure was 1 or 2 atm. The feed concentration and the progress of the breakthrough curve from the adsorption column were continuously monitored using an Infra-Red Gas Monitor (model RS232 interface adaptor, Edinburgh Sensors Limited).

The breakthrough times, shown in Table 5 below, were obtained from breakthrough curves. Unexpectedly, the three hollow fibers demonstrated breakthrough times much longer than that of the 13× commercial pellet and adsorption capacity much larger than that of the 13× commercial pellet. More specifically, the breakthrough times of C-12, C-16, C-19, and the 13× commercial pellet at 1 atm were 149, 170, 141, and 74 minutes, respectively; and the adsorption capacities of C-12, C-16, C-19, and the commercial pellet were 2.67, 2.9, 2.5, and 1.4%, respectively.

TABLE 5

Breakthrough times and absorption capacities for hollow fibers C-12, C-16, C-19, and commercial pellet 13X

| | Adsorption column | | | | | | | |
|---|---|---|---|---|---|---|---|---|
| | C-12 90 fibres 36.8 g | | C-16 88 fibres, 39.2 g | | C-19 85 fibers 37.7 g | | Commercial pellet 13X, 40 g | |
| | $N_2$ pressure, atm | | | | | | | |
| | 1 | 2 | 1 | 2 | 1 | 2 | 1 | 2 |
| Breakthrough time, minute | 149 | 200 | 170 | 215 | 141 | 151 | 74 | 87 |
| Absorption capacity,% | 2.67 | 7.12 | 2.9 | 7.29 | 2.5 | 5.58 | 1.4 | 3.5 |

Example 20

The adsorption performance of two hollow fibers of this invention, i.e., hollow fibers A-25 and A-28 prepared in Examples 6 and 7, was measured. The adsorption performance of two comparative hollow fibers prepared in Examples 1-7, i.e., A-25' and A-28', each having a straight channel, was also measured and compared with that of spiral hollow fibers A-25 and A-28.

Adsorption assays were carried out following the procedures described in Example 17 except that different columns and moisture, instead of n-butane, were used. Four columns were assembled each containing packed hollow fibers (50 g and 24 cm). Moisture was mixed with $N_2$. The $N_2$ pressure was 1 atm. The flow rate was 1 L/min.

The breakthrough times were obtained from breakthrough curves. The spiral hollow fibers had an adsorption performance much better than that of the straight hollow fibers. More specifically, spiral hollow fiber A-28 showed a breakthrough time of 7 hours, much longer than that of the straight hollow fiber A-28', i.e., 5.4 hours; and spiral hollow fiber A-25 showed a breakthrough time of 4.8 hours, much longer than that of straight hollow fiber A-25', i.e., 3.9 hours.

Other Embodiments

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A hollow fiber for adsorption or filtration, the hollow fiber comprising
   a tubular matrix having a first end and a second end, and
   a winding channel formed through the tubular matrix during spinning and coagulation and extending between the first end and the second end, the winding channel being a spiral having a pitch of 1 to 200 mm and a round opening having a diameter of 0.05 to 9.95 mm,
wherein the tubular matrix is porous and has a surface-area-to-volume ratio of 10 to 20000 $m^2/m^3$, an outside diameter of 0.1 to 10 mm, and a length 10 to 90% that of the winding channel.

2. The hollow fiber of claim 1, wherein the tubular matrix contains an inorganic adsorbent.

3. The hollow fiber of claim 2, wherein the tubular matrix has a surface-area-to-volume ratio of 200 to 6000 $m^2/m^3$, an outside diameter of 1 to 5 mm, and a length 20 to 60% that of the winding channel; the winding channel has a diameter of 0.1 to 3 mm; and the inorganic adsorbent is 0.1 to 95% by weight of the hollow fiber.

4. The hollow fiber of claim 3, wherein the tubular matrix has a surface-area-to-volume ratio of 1000 to 4000 $m^2/m^3$, an outside diameter of 1 to 3 mm, and a length 20 to 40% that of the winding channel; the winding channel has a diameter of 0.1 to 2 mm; and the inorganic adsorbent is 75 to 90% by weight of the hollow fiber.

5. The hollow fiber of claim 2, wherein the tubular matrix further contains a polymeric material.

6. The hollow fiber of claim 5, wherein the tubular matrix has a surface-area-to-volume ratio of 200 to 6000 $m^2/m^3$ an outside diameter of 1 to 5 mm, and a length 20 to 60% that of the winding channel; the winding channel has a diameter of 0.1 to 3 mm; the inorganic adsorbent is 0.1 to 95% by weight of the hollow fiber; and the polymeric material is 5 to 99.9% by weight of the hollow fiber, the inorganic adsorbent being type A zeolite, type X zeolite, type Y zeolite, high silica molecular sieves, mesoporous molecular sieves, porous metal-organic framework materials, activated carbon, carbon molecular sieves, or a combination thereof; and the polymeric material being polysulfone, polyether sulfone, polyvinylidene fluoride, polyphenylsulfone, polyacrylonitrile, cellulose acetate, cellulose diacetate, polyimide, polyetherimide, polyamide(aromatic), polyvinyl alcohol, poly(lactic acid), polyglycolic acid, poly(lactic-co-glycolic acid), polycaprolactone, polyvinyl pyrrolidone, ethylene vinyl alcohol, polydimethylsiloxane, or a combination thereof.

7. The hollow fiber of claim 6, wherein the tubular matrix has a surface-area-to-volume ratio of 1000 to 4000 $m^2/m^3$, an outside diameter of 1 to 3 mm, and a length 20 to 40% that of the winding channel; the winding channel has a diameter of 0.1 to 2 mm; the inorganic adsorbent is 75 to 90% by weight of the hollow fiber; and the polymeric material is 10 to 25% by weight of the hollow fiber, the inorganic adsorbent being type A zeolite, type X zeolite, high silica molecular sieves, mesoporous molecular sieves, activated carbon, or a combination thereof; and the polymeric material being polysulfone, polyether sulfone, polyvinylidene fluoride, polyphenylsulfone, or a combination thereof.

8. The hollow fiber of claim 2, wherein the tubular matrix further contains an inorganic binder.

9. The hollow fiber of claim 8, wherein the tubular matrix has a surface-area-to-volume ratio of 200 to 6000 $m^2/m^3$, an outside diameter of 1 to 5 mm, and a length 20 to 60% that of the winding channel; the winding channel has a diameter of 0.1 to 3 mm; the inorganic adsorbent is 0.1 to 95% by weight of the hollow fiber; and the inorganic binder is 5 to 99.9% by weight of the hollow fiber, the inorganic adsorbent being type A zeolite, type X zeolite, type Y zeolite, high silica molecular sieves, mesoporous molecular sieves, porous metal-organic framework materials, or a combination thereof; and the inorganic binder being aluminum oxide, silicon dioxide, bentonite, China clay, hydroxylapatite, hyplas clay, calcium silicate, magnesium silicate, sodium silicate, sodium sulfate anhydrous, zirconium silicate, zircon opaque, silicon carbide, $(Ba,Pb)TiO_3$, lead bisilicate frit, lead sesquisilicate frit, low expansion frit, soft borax frit, standard borax frit, or a combination thereof.

10. The hollow fiber of claim 9, wherein the tubular matrix has a surface-area-to-volume ratio of 1000 to 4000 $m^2/m^3$, an outside diameter of 1 to 3 mm, and a length 20 to 40% that of the winding channel; the winding channel has a diameter of 0.1 to 2 mm; the inorganic adsorbent is 75 to 90% by weight of the hollow fiber; and the inorganic binder is 10 to 25% by weight of the hollow fiber, the inorganic adsorbent being type A zeolite, type X zeolite, high silica molecular sieves, mesoporous molecular sieves, or a combination thereof; and the inorganic binder being aluminum oxide, silicon dioxide, bentonite, China clay, hyplas clay, calcium silicate, magnesium silicate, sodium silicate, sodium sulfate anhydrous, zirconium silicate, zircon opaque, lead bisilicate frit, lead sesquisilicate frit, low expansion fit, soft borax frit, standard borax frit, or a combination thereof.

11. The hollow fiber of claim 2, wherein the tubular matrix further contains an electrically conductive material.

12. The hollow fiber of claim 11, wherein the electrically conductive material forms an outside layer of the tubular matrix.

13. The hollow fiber of claim 1, wherein the tubular matrix contains an inorganic binder.

14. The hollow fiber of claim 1, wherein the tubular matrix contains a polymeric material.

15. The hollow fiber of claim 1, wherein the tubular matrix is a two-layered matrix.

16. A method of preparing a hollow fiber of claim 1, the method comprising:
   providing a spinneret including a tube surrounded by a first orifice, the exit end of the tube having a bevel angle of 15-80°;
   passing a bore fluid through the tube;
   passing a first spinning dope through the first orifice, the first spinning dope containing an inorganic adsorbent;
   bringing together the first spinning dope with the bore fluid when they exit the spinneret to form a hollow fiber precursor;
   spinning the tube of the spinneret while the first spinning dope and the bore fluid exit the spinneret; and
   coagulating the hollow fiber precursor in a coagulation liquid to form a spiral hollow fiber,
wherein the spinneret is spun at a speed of 1 to 200 rpm while the first spinning dope and the bore fluid exit the spinneret, thereby forming a spiral channel having a pitch of 1 to 200 mm.

17. The method of claim 16, wherein the first orifice is surrounded by a second orifice, and, when passing the first spinning dope through the first orifice, a second spinning dope is passed through the second orifice, such that the first spinning dope contacts the second spinning dope when the two spinning dopes exit the spinneret, the second spinning dope containing an electrically conductive material.

* * * * *